Sept. 1, 1953 R. J. LOWE 2,650,372
PILLOW ADJUSTER FOR AUTOMOBILE MECHANIC'S CREEPER
Filed Aug. 9, 1948 2 Sheets-Sheet 1

Richard J. Lowe
INVENTOR.

Sept. 1, 1953           R. J. LOWE           2,650,372
PILLOW ADJUSTER FOR AUTOMOBILE MECHANIC'S CREEPER
Filed Aug. 9, 1948           2 Sheets-Sheet 2

Richard J. Lowe
INVENTOR.

Patented Sept. 1, 1953

2,650,372

UNITED STATES PATENT OFFICE 2,650,372

PILLOW ADJUSTER FOR AUTOMOBILE MECHANIC'S CREEPER

Richard J. Lowe, Centerville, Iowa

Application August 9, 1948, Serial No. 43,179

2 Claims. (Cl. 5—75)

The present invention relates to new and useful improvements in creepers for the use of automobile mechanics when working beneath an automobile or other motor vehicle.

An important object of the invention is to provide an adjustable head rest for the creeper to relieve the workman of strain and the fatigue caused by the mechanic holding his head in a raised position while working under the vehicle.

A further object of the invention is to provide an adjustable head rest which may be manipulated by the workman while lying on the creeper.

A still further object is to provide an adjustable head rest which may be easily and quickly attached in position to the creeper without necessitating any changes or alterations in the construction thereof and which, at the same time, is simple and practical in construction, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
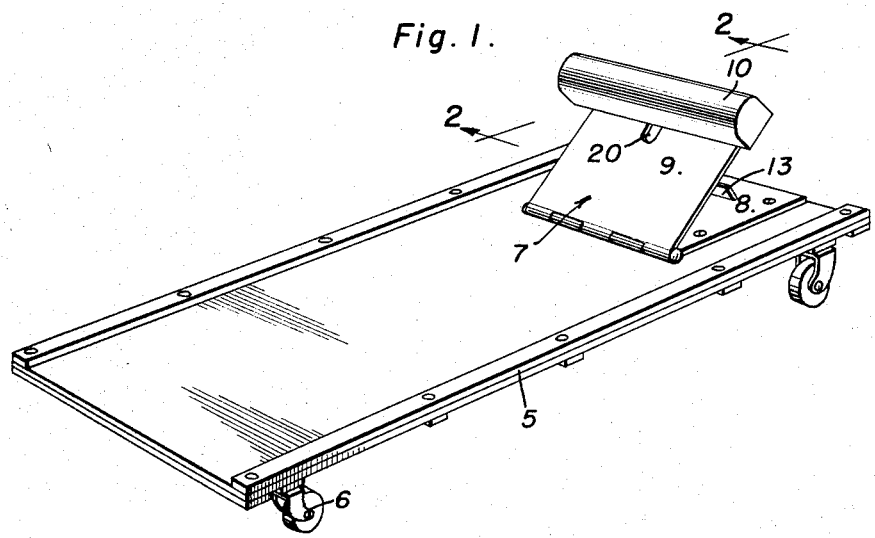
Figure 1 is a perspective view.

Referring now to the drawings in detail wherein, for the purpose of illustration, I have disclosed a preferred embodiment of my invention, the numeral 5 designates the creeper frame or bed of substantially rectangular shape and supported at its corners on swivelly mounted rollers or casters 6 to facilitate its movement on the ground or floor of a garage into a desired position under a vehicle.

At one end of the frame or bed 5 is secured the head rest forming the subject of the present invention and designated generally at 7. The head rest comprises a lower plate 8 suitably secured in a fixed position to the creeper and an upper plate 9 hinged at its inner end to the adjacent end of the lower plate 8 for vertical raising and lowering movement of the upper plate 9. A pad 10, which forms a pillow, is suitably secured to the upper surface at the free end of the upper plate 9.

Figure 2:
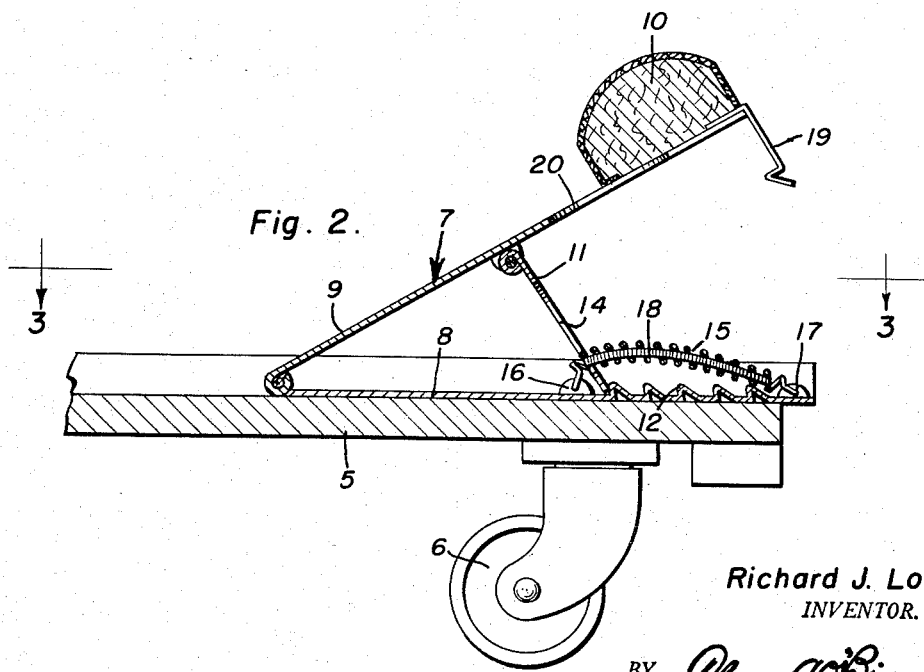
Figure 2 is an enlarged fragmentary longitudinal sectional view taken substantially on the line 2—2 of Figure 1.
Figure 3:
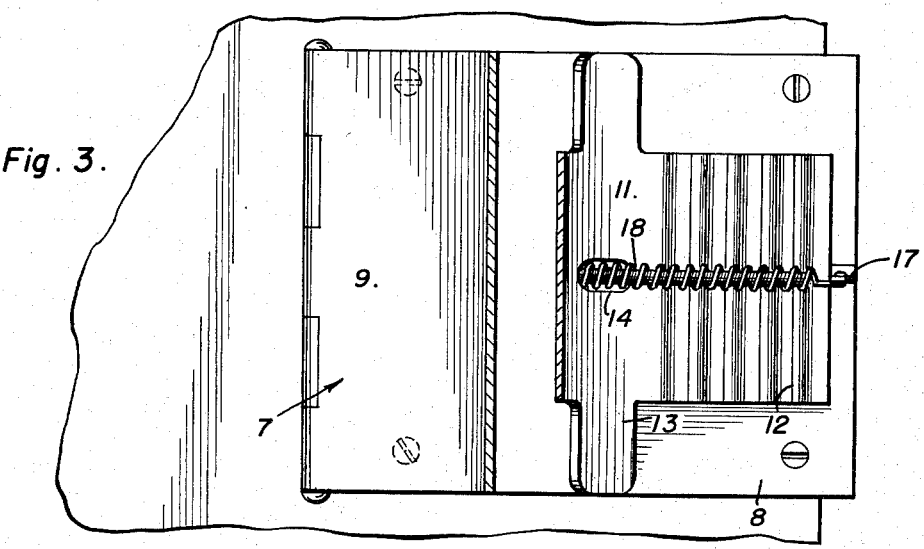
Figure 3 is a sectional view taken on the line 3—3 of Figure 2.
Figure 4:
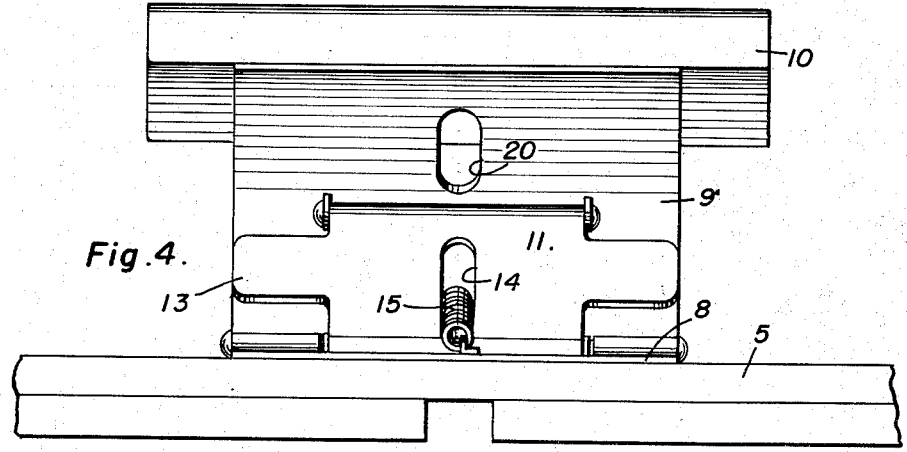
Figure 4 is a rear elevational view.
Figure 5:
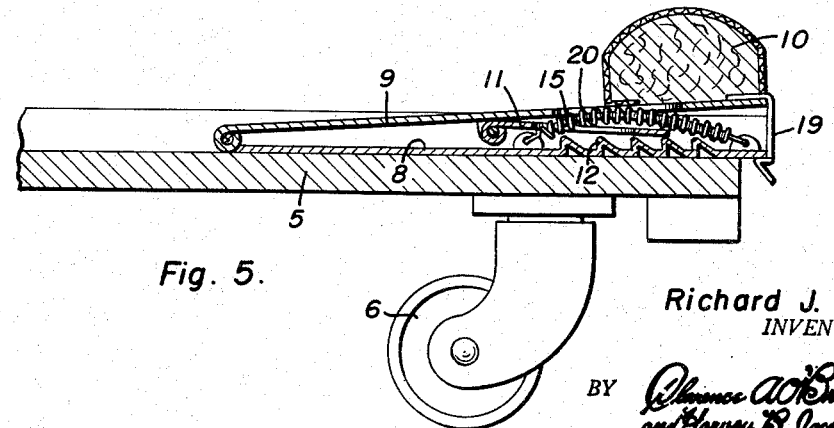
Figure 5 is a longitudinal sectional view of the adjustable head rest shown in its lowered position.

A prop 11 is pivotally attached at one end to the under side of upper plate 9 and with its lower edge in a position for selective engagement with a longitudinal row of teeth 12 rising from the lower plate 8. The teeth 12 may be formed of corrugations in the surface of the plate 8, as shown more clearly in Figure 2 of the drawings, or otherwise integrally formed therewith.

A tongue or finger grip 13 projects outwardly at each side of prop 11 to a position adjacent the side edges of the upper plate 9 to conveniently enable the hand of a workman lying on the creeper to reach under plate 9 to engage the prop to adjust the same in the teeth 12.

The prop 11 is formed with a slot 14 through which a coil spring 15 extends with one end of the spring secured to an apertured ear 16 in front of the prop and the other end of the spring secured to an apertured ear 17 at the rear of the prop, said ears being suitably secured to the lower plate 8 at opposite ends of the group of teeth 12. The coil spring 15 is preferably provided with an inner spring 18 to strengthen the spring and prevent the binding of the prop in the convolutions of the spring.

The rear edge of upper plate 9 is provided with a resilient catch 19 to engage the rear edge of lower plate 8 to hold the head rest in its lowered position. The upper plate 9 is formed with a slot 20 to receive the spring 15 when the head rest is lowered.

In the operation of the device, the lower plate 8 is attached at one end of a creeper bed or frame 5 to project slightly beyond the creeper for engagement by catch 19 when the head rest is lowered.

The upper plate 9 to which the pad 10 is secured may be raised and lowered while a workman is lying on the creeper by reaching under plate 9 to grasp tongues 13 and swing prop 11 upwardly or downwardly. The prop is held in its adjusted position by the teeth 12. Spring 15 engaged in slot 14 of the prop holds the prop from accidental displacement.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A head rest for mechanics' creepers comprising a hinge structure including a lower fixed plate adapted for attaching on top of a creeper and an upper vertically swingable plate overlying the lower plate, a pad carried by the upper plate, teeth formed on the lower plate, a prop pivoted to the upper late and selectively engaged with said teeth to hold the upper plate in vertically adjusted position, said prop having an opening, and an elongated resilient member attached under tension at its end portions to the lower plate and passing freely through the opening in a bowed position to hold the prop engaged with a selected tooth.

2. A head rest for mechanics' creepers comprising a hinge structure including a lower fixed plate adapted for attaching on top of a creeper and an upper vertically swingable plate overlying the lower plate, a pad carried by the upper plate, a prop pivoted to one of the plates and engaging the other plate for holding the upper plate in a raised position, said prop having an opening, and spring means having each end anchored to the lower plate and freely engaged in said opening to hold the prop in adjusted position.

RICHARD J. LOWE.

References Cited in the file of this patent

UNITED STATES PATENTS

| Number | Name | Date |
|---|---|---|
| 262,121 | Richter | Aug. 1, 1882 |
| 319,537 | Winter | June 9, 1885 |
| 1,003,982 | Butler | Sept. 26, 1911 |
| 1,104,398 | Zimmerman | July 21, 1914 |
| 1,706,579 | Martin | Mar. 26, 1929 |
| 2,368,436 | Williams | Jan. 30, 1945 |
| 2,430,662 | Barton | Nov. 11, 1947 |